3,254,282
ENCAPSULATED ELECTRICAL CAPACITOR
Robert A. West, Hudson Falls, N.Y., assignor to General Electric Company, a corporation of New York
Filed Dec. 18, 1963, Ser. No. 331,454
8 Claims. (Cl. 317—258)

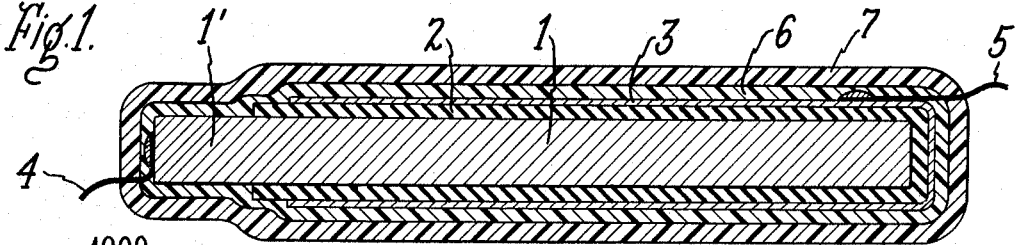
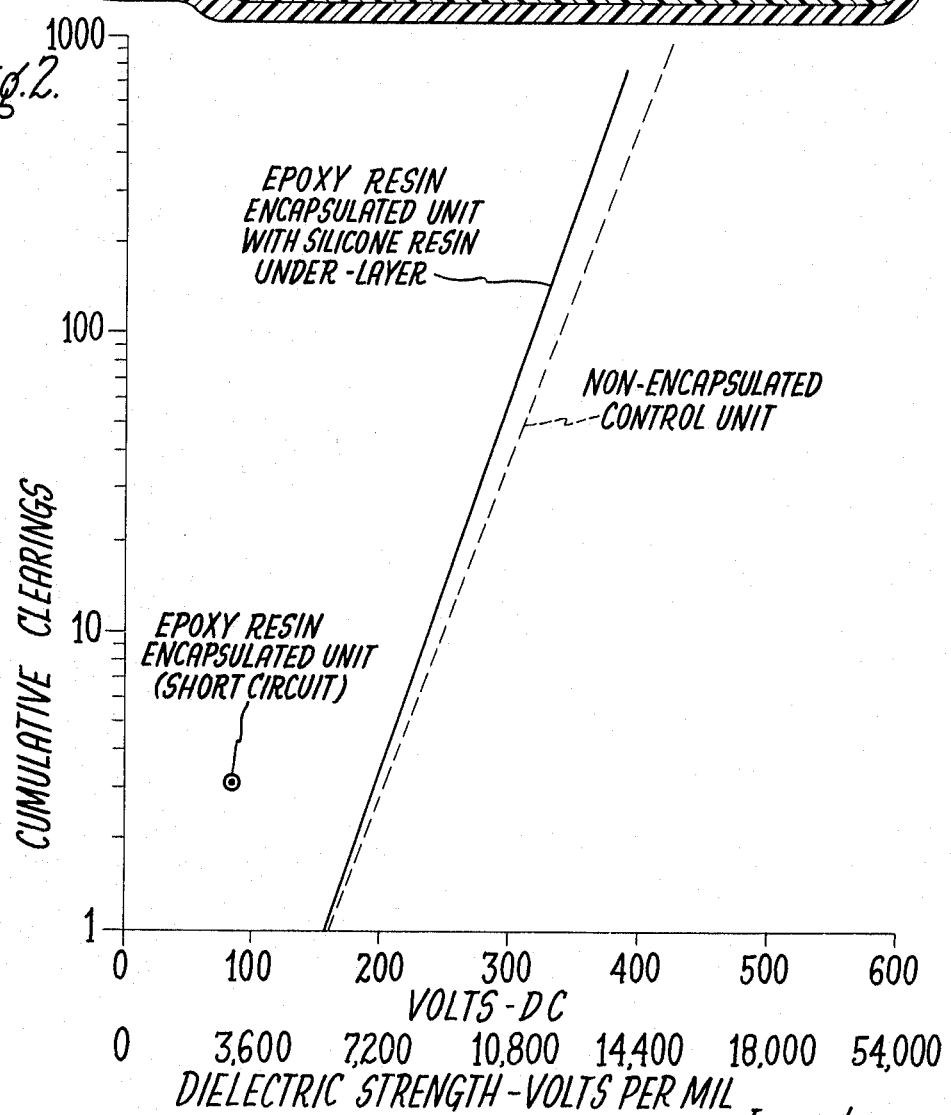

The present invention relates to encapsulated electrical devices, and more particularly to improved encapsulated dry type electrical capacitors.

Several attempts have been made in the past to construct solid, dry types of capacitors wherein one electrode is a filming metal on which an oxide film is anodically formed to serve as the capacitor dielectric, and an electrically conductive layer is deposited over the dielectric oxide film to serve as the second electrode.

It has been found to be necessary to seal such dry type capacitors in suitable encapsulating material in order to obtain full efficiency under operating conditions by protecting the unit from the adverse effects of moisture and other contaminants in the atmosphere and to provide resistance to mechanical shock in use and handling. For this reason, such dry type capacitors have been encapsulated in synthetic resin materials, particularly epoxy resin compounds, such as by dipping the unit in the liquid resin and thereafter curing and hardening the encapsulating material. However, it has been found that such resin encapsulating processes frequently results in poor electrical properties of the capacitor, including decreased clearing or self-healing ability, and premature failure during operation. It appears that mechanical stresses occurring in the capacitor dielectric as a result of the process of curing the encapsulating resin may contribute in large part to such adverse effects.

It is an object of the invention to provide encapsulated electrical devices, especially dry type capacitors, which overcome the above disadvantages.

It is another object to provide a resin-encapsulated dry oxide capacitor which has improved dielectric strength, has longer life under higher operating voltages, and has good clearing (i.e., self-heating) characteristics.

It is a further object of the invention to provide capacitors of the above type having an anodic oxide dielectric layer wherein the latter is protected from damage due to encapsulating processes to which the capacitor is subjected.

It is still another object of the invention to provide a protective means for anodic dielectric oxide layers of capacitors as above described which do not cause detrimental effects to the stability of the capacitor system or the self-healing characteristics thereof.

Other objects and advantages will become apparent from the following description and the appended claims.

With the above objects in view, the present invention relates in a preferred embodiment to an electrical capacitor comprising a base electrode of film-forming metal having a thin anodic dielectric oxide layer formed thereon, a metallized electrode layer overlying the dielectric layer in contact therewith and separated thereby from the base electrode, a protective layer of yieldable elastomeric material enveloping the metallized film-formed base electrode, and an outer rigid coating of a hardened, moisture impervious, shock-resistant synthetic resin material overlying and encapsulating the assembly of layers.

In a preferred form of the invention, the yieldable protective layer is composed of a silicone elastomer material, and the encapsulating coating is composed of an epoxy resin compound.

The invention will be better understood from the following description taken in conjunction with the accompanying drawing, in which:

FIGURE 1 is a cross-sectional view in exaggerated scale of a capacitor constructed in accordance with the present invention; and FIGURE 2 is a graphical showing of the improved electrical properties of a capacitor constructed in accordance with the invention.

Referring now to the drawing, and particularly to FIGURE 1, there is shown a solid dry type capacitor comprising an aluminium plate 1 serving as the base electrode of the capacitor. Instead of being solid aluminum, base plate 1 may be of any suitable supporting material having a coating of aluminum thereon. Formed over a major portion of the surface of electrode plate 1 is a thin, anodically deposited aluminum oxide dielectric film 2 with an end portion 1' of plate 1 being left free of the oxide film to serve as a terminal region. Deposited over anodic oxide layer 2 is a thin metallic layer 3 which serves as the counter electrode and may be composed of aluminum or any other suitable conducting material such as tin, silver, copper, lead, zinc, or non-metallic solid conductive material such as carbon, and may be applied by any metallizing or other suitable depositing techniques. A satisfactory metal coating may be produced, for example, by vacuum evaporation of the desired metal, or by sputtering, dipping, painting, chemical deposition, or the like. As shown, the end portions of the dielectric oxide film 2 are left free of the metal electrode material 3 by the use of suitable masking means such as a coating or varnish, wax or shield to avoid the possibility of a short-circuit between the two electrodes. Leads 4 and 5 are respectively connected to the base electrode 1 and metallized counter electrode 3 by any suitable means, such as by welding or other means. In a typical construction electrode plate 1 is 4 mils thick; dielectric oxide coating 2, 1750–7000 Angstrom units thick; and metallized electrode layer 3, 1500 Angstrom units thick.

In accordance with the invention, a coating 6 of silicone elastomer is provided on the capacitor enveloping the surfaces thereof in a layer about 5 to 10 mils thick, and the unit is then encapsulated with an outer coating 7 of a suitable protective material, especially an epoxy resin. The encapuslating layer 7 may be of any desired thickness, but in a typical arrangement is about 20 mils thick. The provision of an intermediate layer 6 as described between the encapsulating layer 7 and the underlying capacitor assembly has been found essential in order to avoid detrimental effects to the capacitor as a result of the encapsulating process. Silicone elastomer layer 6 acts, in effect, as a buffer between the outer encapsulating layer and the extremely thin metalized aluminum oxide dielectric layer 2 and protects the latter from stresses occuring as a result of curing the resin outer coating after it is applied. The material used for layer 6 must, however, serve not only as a protective buffer as mentioned, but also must be able to withstand "clearing" effects, caused by momentary current increase taking place at the interface between the protective layer 6 and the metallized layer 3, without causing undesirable effects, e.g., leaving carbon deposits due to such clearing which form low resistance leakage paths between the base electrode 1 and counter electrode film 3.

The silicone compound used for protective layer 6 may be any of numerous resilient organopolysiloxane compounds which are readily available, and which have the characteristics described in detail below.

In general, conventional silicone rubbers which may be used in the present invention are made from organopolysiloxane compositions which are typically convertible by heat to the cured, solid, elastic state and generally have the formula $$R_n SiO_{\frac{4-n}{2}}$$

where R is a monovalent organic radical, for instance a monovalent hydrocarbon radical or a halogenated monovalent hydrocarbon radical, and n has a value of from 1.9 to 2.1. For purposes of illustrating the various convertible organopolysiloxanes which may be employed in practicing the present invention, reference is made to the patent to Brown et al., 3,082,181 and patents mentioned therein relating to such organopolysiloxane compositions. Further disclosures of such organopolysiloxane compositions are found in Berridge, 2,843,555, and Caprino et al., 3,096,303.

The silicone composition to be used in practicing the invention is a silicone elastomer, as distinguished from a resin, and the uncured silicone material applied to the capacitor is a solvent-less liquid having a relatively low viscosity, i.e., not higher than about 10,000 centipoises at 25° C. and typically about 2000 to 4000 centipoises. The silicone material is preferably poorly adherent to the metal electrode surface of the capacitor. Preferably, to obtain optimum self-clearing characteristics, the hydrocarbon radicals attached to the silicon in the silicone compound are principally methyl groups. In this way, the undesirable carbon-tracking effects which would otherwise occur in the presence of higher carbon groups are minimized during the self-clearing action of the capacitor.

The use of solvent-less silicone elastomers reduces the risk of producing pores and voids in the resulting elastomer coatings, which would otherwise occur as a result of removing solvent from the deposited layers.

A silicone elastomer material which has been found particularly satisfactory for the purposes of the invention is obtained by preparing a solvent-less organopolysiloxane encapsulating fluid which comprises forming a homogeneous mixture of an organic solvent solution of a resinous copolymer of $R_3SiO_{0.5}$ units and $SiO_2$ units and a liquid silanol chain-stopped diorganopolysiloxane, where R is a monovalent hydrocarbon radical, and heating the homogeneous mixture at an elevated temperature to remove substantially all of the organic solvent. Such a silicone rubber material and the method of making the same are more fully disclosed in copending application Serial No. 79,555, Modic, filed December 30, 1960, and assigned to the same assignee as the present invention, the disclosure of the copending application being incorporated herein by reference.

In a particularly preferred embodiment of the present invention, the R groups in the last mentioned formula $R_3SiO_{0.5}$ are chiefly methyl groups, for reasons already indicated. An example of a commerically available silicone elastomer of this type, made as described in the aforementioned Modic application, is known as LTV-602 of General Electric Company.

A typical method of making such a silicone elastomer, as described in the Modic application, is the following. A resinous copolymer was prepared by reacting trimethylchlorosilane and ethylorthosilicate to form a copolymer of trimethylsiloxane units and $SiO_2$ units in which the ratio of trimethylsiloxane units to $SiO_2$ units was about 0.5 to 1. Sixty parts of this resinous copolymer was dissolved in 40 parts xylene and mixed with 300 parts by weight of a silanol chain-stopped dimethylpolysiloxane having a viscosity of approximately 2000 centipoise when measured at 25° C. This mixture was heated at a temperature of about 40° C. under a reduced pressure of about 100 millimeters to remove approximately 99 percent of the xylene solvent, resulting in a flowable liquid having a viscosity of about 2000 centipoises when measured at 25° C. and containing an average of about 0.25 percent by weight hydroxyl groups. To 100 parts of this liquid was added 0.25 part of N,N-dimethyl soya amine and 0.25 part butyl glycidyl ether.

While silicone elastomer compounds of the above described type have been found to provide exceptionally good results, other materials may also be found useful. In general, the material used should be such that it makes a poor mechanical bond to the underlying layers of the capacitor while still fully covering them, the resin film should be flexible or yieldable (i.e., at least somewhat resilient) and moisture repellent, and it should permit effective clearing of the metallized anodic dielectric film.

Examples of other materials having such characteristics which may be used in practicing the invention are as follows: fluorinated hydrocarbons, such as Teflon, and chlorofluorinated hydrocarbons, such a Kel-F.

The epoxy resin materials preferably used for encapsulating the capacitors are well known in the art and any resin of this composition suitable for such purposes may be used. These resins are the condensation products of polyhydroxy compounds, such as polyhydric phenols and polyhydric alcohols, and epichlorohydrin. Examples of polyhydroxy compounds which may be used are glycerol, diphenylol propane and the mixed poly(hydroxylphenyl) pentadecanes derived from cashew nuts. An example of an epoxy resin which may be used in practicing the invention is the condensation product of epichlorohydrin and 2, 2' bisphenylol propane. Such epoxy resins may be cured by any of the known cross-linking agents therefor such as amines, amine-producing compounds, dibasic acid anhydrides, and other curing agents known in the art.

The epoxy resin encapsulating material serves primarily to provide protection to the encapsulated unit against mechanical shock, moisture and other environmental effects deleterious to the proper functioning and long life of the capacitor.

A typical process which may be carried on in making encapsulated dry type capacitors in accordance with the invention is as follows, it being understood that the procedure set forth is simply illustrative and not intended to limit the invention in any way:

The capacitor element as shown in FIGURE 1 is first dipped in General Electric silicone potting compound LTV-602 using a 1% by weight lead octoate or tin octoate catalyst. The dipped unit is allowed to cure for 1 hour at 85° C. resulting in a coating from 2-5 mils thick. Then the capacitor element is dipped in an epoxy resin such as Hysol #11004 using an amine catalyst and allowed to cure for 1 hour at 85° C., the thickness of this coating being between 10 and 20 mils.

While epoxy resins have been found particularly suited for encapsulating the unit, the invention is not limited to capacitors encapsulated with this resin material, since the benefits of the invention may be obtained where other types of encapsulating material are used and where such use causes detrimental effects as described above. For example, such encapsulating material may in general be thermoplastic or thermosetting resins, but is preferably a thermosetting resin such as phenolformaldehyde condensation product, melamine-formaldehyde, and urea formaldehyde resins. Examples of suitable thermoplastic molding compounds are polystyrene, polyethylene, acrylates and polytetrafluoroethylene. The encapsulating material may also contain filler material as is known in the art, such as mineral or fibrous fillers. Encapsulation may be carried out by various molding processes, compression molding, for example, with or without heating being ordinarily used for the thermosetting resins, and injection molding usually being employed with the thermoplastic materials and generally with heat. Casting procedures may also be used where appropriate.

The invention may be employed for encapsulating dry oxide capacitors other than the aluminum electrode type described. For example, other film-forming metals such as tantalum, niobium, zirconium, titanium, and the like, or film-forming alloys thereof, could be used as the base electrode if desired, on which anodic dielectric oxide films are formed in accordance with well known techniques.

Comparative tests were conducted using (1) a control capacitor of dry oxide aluminum construction without any encapsulating or protective layers, (2) a capacitor of the same construction having only an epoxy resin encapsulation coating, and (3) a capacitor having the same construction with both an epoxy resin encapsulation layer and an intermediate silicone elastomer layer in accordance with the invention.

FIGURE 2 illustrates the results of dielectric breakdown tests conducted on these capacitors. In the graph, the number of cumulative clearings in these tests are plotted against D.-C. voltages applied to the capacitors and the corresponding dielectric strength in volts per mil. The self-healing mechanism of "clearing" which occurs in metallized electrode capacitors such as those used in the tests not only provides a means of isolating faults in the dielectric film of the capacitor during operation and permits higher operating voltages, but also serves as a basis for evaluating quality of the film in terms of the number of faults per unit area of the dielectric film. In the tests illustrated by the FIGURE 2 graph, the cumulative fault distribution was obtained by increasing the voltage across each sample in a step-wise manner and determining the cumulative number of failures and accompanying electrode clearings.

As shown on the graph, the sample having only an epoxy resin encapsulating layer failed by short-circuit at 90 volts after only three clearings, indicating a dielectric strength of less than 3600 volts per mil. This premature failure is in contrast to the results obtained with the sample having an epoxy resin encapsulating layer in conjunction with an intermediate silicone protective layer in accordance with the invention, which exhibited a high level of dielectric strength accompanied by clearings as the voltages applied were increased. As shown, the results obtained with the latter unit were comparable to those produced by the non-encapsulated control unit which would not, of course, be subject to stresses as produced by the epoxy resin coating of the encapsulated units. It is evident from the graph, therefore, that the provision of a protective silicone layer in a resin encapsulated capacitor largely overcomes the detrimental effects produced by the described encapsulating process in the absence of such a protective layer.

Life tests made on dry oxide capacitors constructed in accordance with the invention also showed favorable results. For example, fourteen epoxy resin encapsulated units incorporating a protective silicone elastomer layer showed little or no change from initial capacitance and dissipation factor after 2000 hours under life test conditions of 85° C. and 50 volts D.-C.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising a base electrode of film-forming metal having an anodic dielectric oxide layer formed thereon, a metallized electrode overlying said dielectric layer in contact therewith and separated thereby from said base electrode, and a composite covering comprising an inner protective layer and a superposed outer layer, said protective layer comprised of yieldable elastomeric material enveloping the metallized film-formed base electrode, and said outer layer comprised of a hardened, moisture impervious, shock resistant synthetic resin material overlying and encapsulating said assembly of layers.

2. An electrical capacitor comprising a base electrode of film-forming metal having an anodic dielectric oxide layer formed thereon, a metallized electrode overlying said dielectric layer in contact therewith and separated thereby from said base electrode, and a composite covering comprising an inner protective layer and a superposed outer layer, said protective layer composed of a yieldable silicone elastomer compound enveloping the metallized film-formed base electrode, and said outer layer comprised of a hardened, moisture impervious, shock resistant synthetic resin material overlying and encapsulating said assembly of layers.

3. An electrical capacitor comprising a base electrode of film-forming metal having an anodic dielectric oxide layer formed thereon, a metallized electrode overlying said dielectric layer in contact therewith and separated thereby from said base electrode, and a composite covering comprising an inner protective layer and a superposed outer layer, said protective layer comprised of a yieldable silicone elastomer compound enveloping the metallized film-formed base electrode, said silicone elastomer compound being solvent-less, poorly adherent to said metallized electrode, and characterized by low carbon-tracking and thereby good self-clearing properties, and said outer layer comprised of a hardened, moisture impervious, shock resistant synthetic resin material overlying and encapsulating said assembly of layers.

4. An electrical capacitor comprising a base electrode of film-forming metal having an anodic dielectric oxide layer formed thereon, a metallized electrode overlying said dielectric layer in contact therewith and separated thereby from said base electrode, a protective layer of yieldable material composed of a silicone elastomer compound enveloping the metallized film-formed base electrode, and an outer rigid coating of an epoxy resin compound overlying and encapsulating said assembly of layers.

5. An electrical capacitor comprising a base electrode of film-forming metal having an anodic dielectric oxide layer formed thereon, a metallized electrode overlying said dielectric layer in contact therewith and separated thereby from said base electrode, a protective layer of yieldable material composed of a silicone elastomer compound enveloping the metallized film-formed base electrode, and an outer rigid coating of a hardened, moisture impervious, shock resistant synthetic resin material overlying and encapsulating said assembly of layers, said synthetic resin material selected from the group consisting of epoxy resin, melamine formaldehyde resin, urea formaldehyde resin, and phenol formaldehyde resin.

6. An electrical capacitor comprising a base electrode of aluminum having an anodic dielectric oxide layer formed thereon, a metallized electrode overlying said dielectric layer in contact therewith and separated thereby from said base electrode, a protective layer of yieldable material composed of a silicone elastomer compound enveloping the metallized film-formed base electrode, and an outer rigid coating of a hardened, moisture impervious, shock resistant synthetic resin material overlying and encapsulating said assembly of layers, said synthetic resin material selected from the group consisting of epoxy resin, melamine formaldehyde resin, urea formaldehyde resin, and phenol formaldehyde resin.

7. An electrical capacitor comprising a base electrode of film-forming metal having an anodic dielectric oxide layer formed thereon, a metallized electrode overlying said dielectric layer in contact therewith and separated thereby from said base electrode, and a composite covering comprising an inner protective layer and a superposed outer layer, said protective layer comprised of a yieldable silicone elastomer compound enveloping the metallized film-formed base electrode, said silicone elastomer compound being solvent-less, poorly adherent to said metallized electrode, and characterized by low-tracking and thereby good-self clearing properties, and said outer layer comprised of a hardened, moisture impervious, shock resistant synthetic resin material overlying and encapsulating said assembly of layers, said silicone elastomer compound being formed of an organopolysiloxane prepared by forming a homogeneous mixture of an organic solvent solution of a resinous copolymer of $R_3SiO_{0.5}$ units and $SiO_2$ units and a liquid silanol chain-stopped diorganopolysiloxane, where R is a monovalent hydrocarbon radical, heating said homogeneous mixture at an elevated temperature to remove substantially all of said organic solvent, adding a curing catalyst to this mixture, casting the mixture including the curing catalyst around said metallized film-formed base electrode, and allowing the silicone elastomer to cure.

8. An electrical capacitor comprising a base electrode of film-forming metal having an anodic dielectric oxide layer formed thereon, a metallized electrode overlying said dielectric layer in contact therewith and separated thereby from said base electrode, and a composite covering comprising an inner protective layer and a superposed outer layer, said protective layer comprised of a yieldable silicone elastomer compound enveloping the metallized film-formed base electrode, said silicone elastomer compound being solvent-less, poorly adherent to said metallized electrode, and characterized by low carbon-tracking and thereby good self-clearing properties, and said outer layer comprised of a hardened, moisture impervious, shock resistant synthetic resin material overlying and encapsulating said assembly of layers, said silicone elastomer compound being formed of an organopolysiloxane prepared by forming a homogeneous mixture of an organic solvent solution of a resinous copolymer of trimethylsiloxane units and $SiO_2$ units and a liquid silanol chain-stopped dimethylpolysiloxane, and heating said homogeneous mixture at an elevated temperature to remove substantially all of said organic solvent, adding a curing catalyst to this mixture, casting the mixture including the curing catalyst around said metallized film-forming base electrode, and allowing the silicone elastomer to cure.

References Cited by the Examiner
UNITED STATES PATENTS

| | | | |
|---|---|---|---|
| 2,683,767 | 7/1954 | Cunningham | 174—52 |
| 2,743,308 | 4/1956 | Bradsley | 174—52 |
| 2,930,951 | 3/1960 | Burger | 317—258 X |
| 3,109,969 | 11/1963 | Seidel | 317—258 |

ROBERT K. SCHAEFER, *Primary Examiner.*

JOHN F. BURNS, *Examiner.*

ELLIOT A. GOLDBERG, *Assistant Examiner.*